(12) United States Patent
Tabor

(10) Patent No.: US 7,686,039 B2
(45) Date of Patent: Mar. 30, 2010

(54) CARTRIDGE VALVE ASSEMBLY

(75) Inventor: Joseph Edward Tabor, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 859 days.

(21) Appl. No.: 11/478,803

(22) Filed: Jun. 30, 2006

(65) Prior Publication Data

US 2008/0000534 A1    Jan. 3, 2008

(51) Int. Cl.
*F15B 13/042* (2006.01)
*F15B 13/043* (2006.01)

(52) U.S. Cl. .............................. 137/625.66; 137/625.64; 251/50

(58) Field of Classification Search ............ 137/625.64, 137/625.66; 251/50
See application file for complete search history.

(56) References Cited

U.S. PATENT DOCUMENTS

| | | | |
|---|---|---|---|
| 3,421,531 A * | 1/1969 | Watson ........................ | 251/50 |
| 3,583,422 A | 6/1971 | Dach et al. | |
| 3,841,345 A | 10/1974 | Cryder | |
| 3,865,140 A * | 2/1975 | Greenwood ............ | 137/625.64 |
| 4,543,977 A * | 10/1985 | Arav ............................ | 251/50 |
| 4,683,915 A | 8/1987 | Sloate | |
| 4,875,501 A * | 10/1989 | Ichihashi et al. ........ | 137/625.64 |
| 4,966,195 A * | 10/1990 | McCabe ................. | 137/625.64 |
| 5,522,301 A | 6/1996 | Roth et al. | |
| 5,836,335 A * | 11/1998 | Harms et al. ............ | 137/625.64 |
| 5,853,028 A * | 12/1998 | Ness et al. ..................... | 251/50 |
| 5,906,352 A | 5/1999 | Post | |
| 5,984,259 A * | 11/1999 | Najmolhoda et al. .......... | 251/50 |
| 6,109,300 A * | 8/2000 | Najmolhoda ........... | 137/625.61 |
| 6,209,565 B1 | 4/2001 | Hughes et al. | |
| 6,494,125 B2 | 12/2002 | Hannus et al. | |
| 6,578,606 B2 * | 6/2003 | Neuhaus et al. ........ | 137/625.65 |
| 6,615,869 B2 * | 9/2003 | Sudani et al. .......... | 137/625.64 |
| 6,694,859 B2 | 2/2004 | Smith | |
| 6,948,514 B1 * | 9/2005 | Kramer et al. ................ | 251/50 |
| 6,966,329 B2 | 11/2005 | Liberfarb | |
| 2002/0152883 A1 | 10/2002 | Oka et al. | |

* cited by examiner

*Primary Examiner*—John Rivell
(74) *Attorney, Agent, or Firm*—Finnegan, Henderson, Farabow, Garrett & Dunner

(57) ABSTRACT

A cartridge valve assembly includes a body having a pilot port, a first port, a second port, a third port fluidly connected to a central bore, and a spool positioned within the central bore and being movable between at least a first position and a second position. The spool includes a first chamber at a first end surface of the spool in fluid communication with the pilot port, a second chamber at a second end surface of the spool, and a control chamber. The area of the first end surface is greater than the area of the second end surface. A passage fluidly communicates the control chamber with the second chamber. In the first position, the first port and the second port fluidly communicate with the control chamber. In the second position, the second port and the third port fluidly communicate with the control chamber.

12 Claims, 3 Drawing Sheets

_US 7,686,039 B2_

CARTRIDGE VALVE ASSEMBLY

TECHNICAL FIELD

The present disclosure relates generally to a valve assembly, and more particularly, to a cartridge valve assembly.

BACKGROUND

In many hydraulically actuated devices, such as brake systems, fuel systems, or other machine systems, valve assemblies can be used to control the operation of components of the system. A valve assembly may open to allow fluid communication between two or more passages to hydraulically move a piston or actuator. For example, one passage may communicate with another passage through the valve so that fluid in a high pressure passage can be drained to a low pressure passage, and the system can be reset for its next operation event.

One conventional valve assembly is described in U.S. Pat. No. 6,694,859 (the '859 patent) issued to Smith. The '859 patent describes a pressure relief valve having a valving element assembly slideably disposed within a housing having inlet and outlet ports. The valving element assembly has a differential area. The pressure of the fluid within a force control chamber acting on the differential area of the valving element assembly urges the valving element assembly against the bias of a spring to control the flow of fluid between the inlet port and the outlet port of the housing.

Although the pressure relief valve of the '859 patent may be a cartridge assembly adapted to be disposed in a block arrangement, the pressure relief valve of the '859 patent does not provide pressure amplification that may be useful in various machine systems.

The disclosed system is directed to overcoming one or more of the problems set forth above.

SUMMARY OF THE INVENTION

In one aspect, the present disclosure is directed to a cartridge valve assembly. The cartridge valve assembly may include a body having a pilot port, a first port, a second port, and a third port fluidly connected to a central bore. The cartridge valve assembly may also include a spool positioned within the central bore and being movable between at least a first position and a second position. The spool may include a first chamber at a first end surface of the spool in fluid communication with the pilot port. The spool may also include a second chamber at a second end surface of the spool, and a control chamber. The area of the first end surface may be greater than the area of the second end surface. The spool may further include a passage fluidly communicating the control chamber with the second chamber. In the first position, the first port and the second port of the body may fluidly communicate with the control chamber. In the second position, the second port and the third port may fluidly communicate with the control chamber.

In another aspect, the present disclosure is directed to a method of pressure control using a cartridge valve assembly. The cartridge valve assembly may include a body adapted to be inserted into a cavity. The body may include a central bore extending along a central axis, a first port, a second port, and a third port fluidly connected to the central bore. A spool may be received in the central bore and being movable between a first position and a second position. The spool may form a first chamber within the central bore at a first end surface of the spool, a second chamber within the central bore at a second end surface of the spool, and a control chamber within the central bore. The area of the first end surface may be greater than the area of the second end surface. The second port may be in fluid communication with the control chamber. The method may include directing a flow of fluid to the first chamber. The fluid in the first chamber may apply a first pressure to the first end surface of the spool to force the spool to move from the first position toward the second position to open the third port to the control chamber, and close the first port from the control chamber. A flow of fluid may be directed through the third port into the control chamber, and through the second port out of the control chamber. A flow of fluid may be directed from the control chamber to the second chamber at the second end surface of the spool. The fluid in the second chamber may apply a second pressure to the second end surface of the spool. The second pressure is substantially equal to a fluid pressure in the control chamber. When a force differential across the spool caused by the second pressure applied to the second end surface and the first pressure applied to the first end surface reaches a predetermined value, the spool may be moved from the second position to the first position to close the third port from the control chamber and open the first port to the control chamber. A flow of fluid may be directed through the second port into the control chamber, and through the first port out of the control chamber.

DETAILED DESCRIPTION

Figure 1:
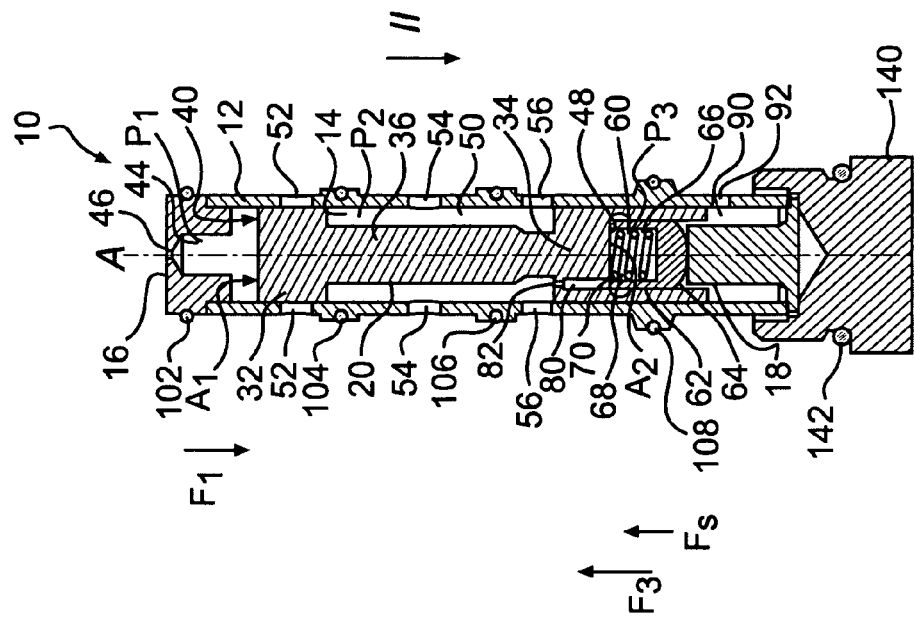
FIG. 1 is a sectional view of an exemplary cartridge valve assembly in a first position according to one embodiment of the disclosure.

FIG. 1 illustrates an exemplary cartridge valve assembly 10. The cartridge valve assembly 10 may be used in a housing cavity joining a plurality of fluid passages. The cartridge valve assembly 10 may be actuated to control fluid to an actuator, for example, an actuator in a brake system, a fuel system, a transmission system, or other machine systems.

The cartridge valve assembly 10 may include a body 12 extending along a central axis A. The body 12 may form a central bore 14 extending along the central axis A. The body 12 may further include an upper stop member 16 attached to an upper end of the body 12 and a lower stop member 18 attached to a lower end of the body 12. A spool 20 may be slideably received within the central bore 14 of the body 12.

The spool 20 may include a first end section 32, a second end section 34, and an intermediate section 36. The first end section 32 may include an upper end (first end) surface 40. The upper end surface 40 and the upper stop member 16 may form a pilot chamber (first chamber) 44 within the central bore 14. The pilot chamber 44 may include a pilot port 46 at the top of the upper stop member 16.

The intermediate section 36 of the spool 20 may have a relatively smaller diameter than the first end section 32 and the second end section 34, such that an outer surface of the intermediate section 36 and an inner surface of the central bore 14 of the body 12 may form a control chamber 50 within the central bore 14. The body 12 may further include a first set of ports 52, a second set of ports 54, and a third set of ports 56. Each set of ports may include one or more ports. The second set of ports 54 may be fluidly connected to the control chamber 50. The first set of ports 52 and the third set of ports 56 may be selectively opened to the control chamber 50 by sliding the spool 20 within the central bore 14.

As shown in FIG. 1, the second end section 34 of the spool 20 may include a slug bore 60 defined within an annular wall 62 in the second end section 34. A slug 64 may be slideably disposed within the slug bore 60 between a lower end (second end) surface 48 of the spool 20 and the lower stop member 18. The slug 64 may include a central bore 66 along a central axis of the slug 64. The central bore 66 of the slug 64 and the lower end surface 48 of the spool 20 may form a feedback chamber (second chamber) 68. A feedback spring 70 may be received in the feedback chamber 68. The feedback spring 70 may be operative to urge the spool 20 toward an upward direction I.

Figure 2:
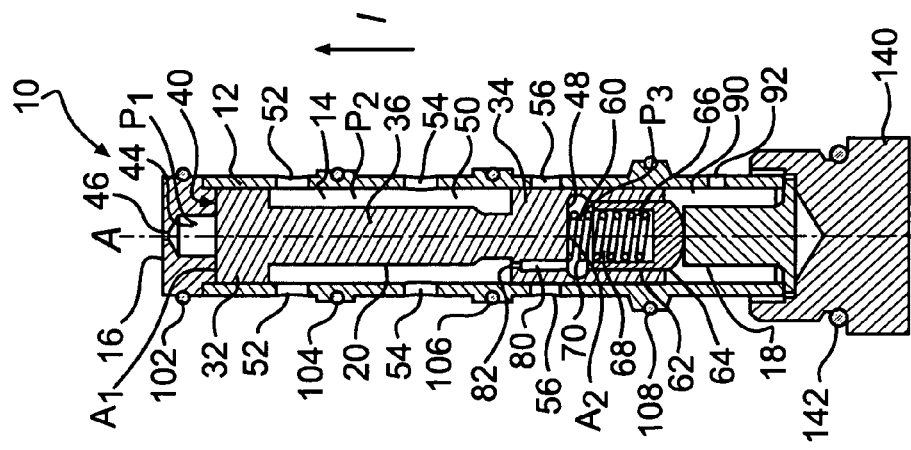
FIG. 2 is a sectional view of the exemplary cartridge valve assembly of FIG. 1 in a second position according to one embodiment of the disclosure.

The spool 20 may further define a passage 80 extending from a first opening in the control chamber 50 to a second opening in the feedback chamber 68. The second stop member 18 may have a diameter which is smaller than or substantially equal to the diameter of the slug 64, so that the annular wall 62 of second end section 34 of the spool 20 may be able to slideably move downward, and an upper end of the lower stop member 18 can be received in the slug bore 60 as shown in FIG. 2. An outer surface of the lower stop member 18 may form a chamber 90 within the central bore 14. The fluid received in the feedback chamber 68 may leak along the interface between the slug 64 and an inner surface of the annular wall 62 into the chamber 90. In order to prevent fluid pressure from building up within the chamber 90, the annular wall 62 may include a lower port 92 fluidly connected to the chamber 90 to direct the fluid out of the chamber 90 and into a low pressure passageway.

As shown in FIGS. 1 and 2, the upper end surface 40 of the spool 20 may have a surface area value A1 defined by that area of the upper end surface 40 exposed to fluid in the pilot chamber 44. The lower end surface 48 of the second end section 34 may have a surface area value A2 defined by that area of the lower end surface 48 exposed to fluid in the feedback chamber 68. The surface area value A1 of the upper end surface 40 may be larger than the surface area value A2 of the lower end surface 48.

As shown in FIGS. 1 and 2, the cartridge valve assembly 10 may further include an adapter 140. The adapter 140 may include a central concave portion for receiving the body 12. The body 12 may be attached to the adapter 140 by screw or other means. An upper portion of the adapter 140 may be adapted to be at least partially inserted into a cartridge cavity within which the cartridge valve assembly 10 is to be positioned. The adapter 140 may include a sealing ring 142 attached to an outer surface of the upper portion of the adapter 140. The sealing ring 142 may be adapted to sealingly engage an inner surface of the cartridge cavity to prevent fluid from flowing out of the cartridge cavity.

The body 12 may include multiple sealing rings attached to an outer surface of the body 12. A first sealing ring 102 may be disposed close to the top of the body 12. A second sealing ring 104 may be disposed between the first set of ports 52 and the second set of ports 54. A third sealing ring 106 may be disposed between the second set of ports 54 and the third set of ports 56. A fourth sealing ring 108 may be disposed between the third set of ports 56 and the lower port 92.

Figure 3:
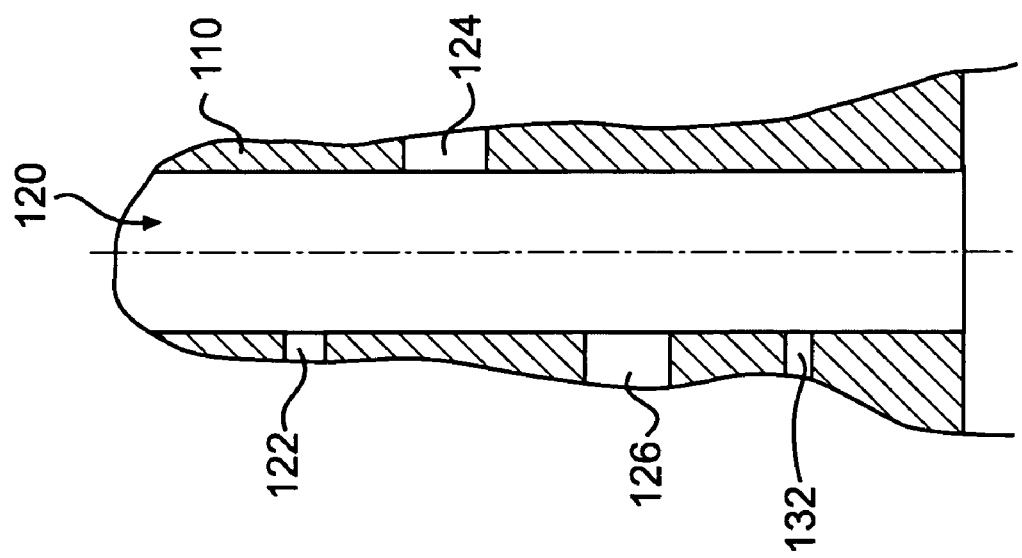
FIG. 3 is a sectional view of an exemplary housing for receiving the cartridge valve assembly of FIGS. 1 and 2.

FIG. 3 shows an exemplary housing 110 forming the cartridge cavity 120 that may receive the cartridge valve assembly 10. The housing 110 may be formed by walls of a manifold assembly, a casting, or other structure of a relevant system, or the housing 110 may itself be adapted to be inserted into a manifold assembly, a casting, or other structure where the cartridge valve assembly 10 is to be positioned. The housing 110 may include a first port 122, a second port 124, a third port 126, and a lower port 132.

When the body 12 is disposed within the housing 110, the sealing rings 102, 104, 106, and 108 sealingly engage an inner surface of the housing 110, such that the first set of ports 52 is fluidly connected to the first port 122 of the housing, but is separated from the other ports (e.g., the pilot port 46 and the second set of ports 54), and the second set of ports 54 is fluidly connected to the second port 124, but is separated from the other ports, the third set of ports 56 is fluidly connected to the third port 126, but is separated from the other ports, and the lower port 92 is fluidly connected to the lower port 132 of the housing 110, but is separated from the other ports.

Figure 4:
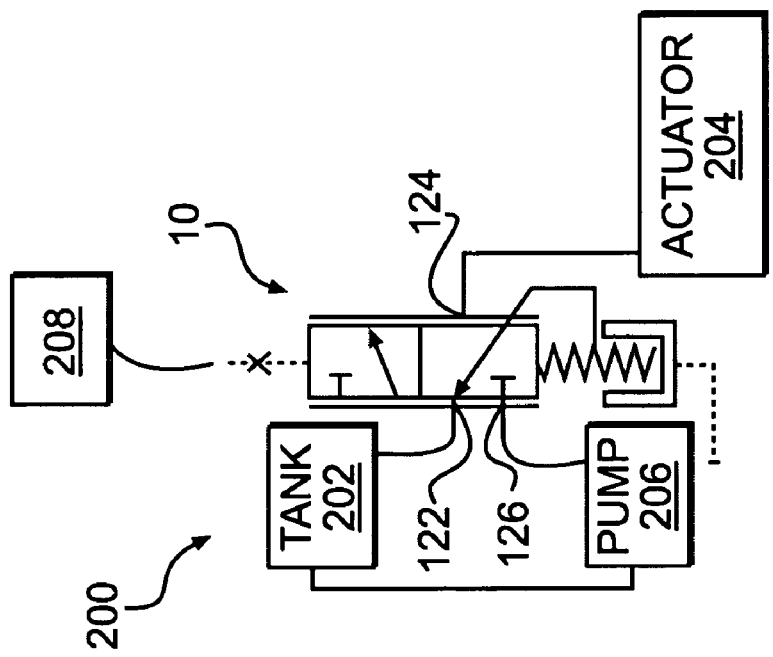
FIG. 4 is a schematic view of an exemplary fluid system incorporating the cartridge valve assembly if FIGS. 1 and 2.

As shown schematically in FIG. 4, the first port 122 in the housing 110 may be fluidly connected to a tank 202, the second port 124 may be fluidly connected to an actuator 204, the third port 126 may be fluidly connected to a pump 206, and the lower port 132 (not shown in FIG. 4) may be fluidly connected to the tank 202. The pump 206 may be fluidly connected to the tank 202.

INDUSTRIAL APPLICABILITY

The disclosed cartridge valve assembly may be used in many applications, for example, pressure control, flow control, pressure relief, etc. The disclosed cartridge valve assembly may be used to control an actuator that may be used in brake systems, fuel systems, transmission systems, or other machine systems. The disclosed valve assembly may provide high-response pressure regulation that may result in consistent and predictable actuator performance by way of a low-cost, simple configuration. The operation of cartridge valve assembly 10 will now be explained.

FIG. 4 illustrates an exemplary use of the cartridge valve assembly 10 in a hydraulic system 200. The hydraulic system 200 may include the tank 202, the fluid actuator 204, and the pump 206. When the spool 20 of the cartridge valve assembly 10 is in the first position as shown in FIG. 1, the first set of ports 52 are open to the control chamber 50, allowing the fluid in the actuator 204 to flow through the second set of ports 54 (which is fluidly connected to the second port 124 of the housing 110) to the control chamber 50, and through the first set of ports 52 (which is fluidly connected to the first port 122 of the housing 110) to the tank 202. When the spool 20 is in the second position as shown in FIG. 2, the third set of ports 56 are open to the control chamber 50, allowing the fluid from the pump 206 to flow through the third set of ports 56 (which is fluidly connected to the third port 126 of the housing 110) to the control chamber 50, and through the second set of ports 54 to the actuator 204. The spool 20 of the cartridge valve assembly 10 may be continuously urged to the first position by a force Fs applied in the direction I by the feedback spring 70 received in the slug 64.

Figure 5:
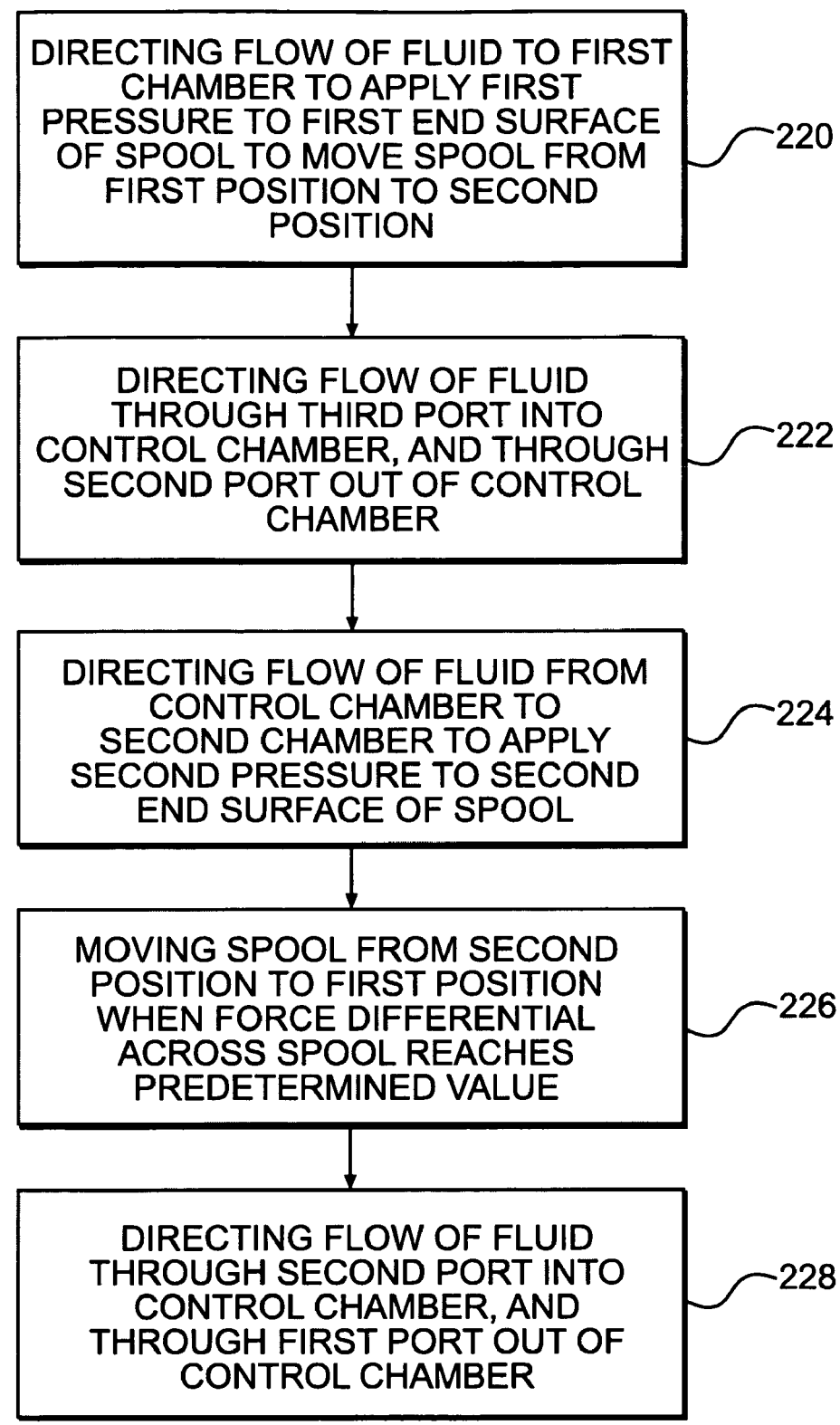
FIG. 5 shows a flow diagram of a method for pressure control using the disclosed exemplary cartridge valve assembly.

FIG. 5 shows a flow diagram of the operation of the cartridge valve assembly 10. At block 220, a pilot signal (as denoted by reference number 208 in FIG. 4), for example, a flow of fluid, may be applied through the pilot port 46 to the pilot chamber 44 to apply a pressure P1 to the upper end surface 40 of the spool 20. The pressure P1 may apply a force F1 to the upper end surface 40 to force the spool 20 downward in the direction II as shown in FIG. 2.

As shown in FIG. 5, at block 222, after the spool 20 is moved downward (as shown in FIG. 2), the first section 32 of the spool 20 may block the first set of ports 52, and the third set of ports 56 may be opened. The fluid may flow from the pump 206 through the third set of ports 56 to the control chamber 50, and from the control chamber 50 through the second set of ports 54 to the actuator 204. When the third set of ports 56 are opened, the fluid flowing from the pump 206 to the control chamber 50 may cause the fluid pressure in the control chamber 50 (denoted as P2 and also referred to as control pressure) to increase.

The fluid in the control chamber 50 may also flow through the passage 80 into the feedback chamber 68 to increase a feedback pressure P3 in the feedback chamber 68. The feedback pressure P3 in the feedback chamber 68 may act on the lower end surface 48 of the second end section 34 of the spool 20, and may apply a force F3 to the spool 20 in the direction I. The feedback spring 70 may also apply the force Fs to the spool 20 in the direction I.

At block 224, since the control chamber 50 is fluidly communicated with the feedback chamber 68 through the passage 80, the pressure P2 in the control chamber 50 is substantial equal to the pressure P3 in the feedback chamber 68. When the pressure in the control chamber increases, the feedback pressure in the feedback chamber 68 also increases, such that the force F3 applied by the feedback pressure P3 to the spool 20 in the direction I increases. At block 226, when the control pressure P3 in the feedback chamber 68 is higher than a predetermined pressure, the force F3 applied by the feedback pressure P3 together with the force Fs applied by the feedback spring 70 is greater than the force F1 applied by the pilot pressure P1, the force F3 plus the force Fs may force the spool 20 to move upward from the second position to the first position. At block 228, when the spool 20 moves to the first position, the first set of ports 52 are open to the control chamber 50, allowing the fluid to flow from the actuator 204 through the control chamber 50 to the tank 202, which may cause the pressure in the control chamber 50 to decrease. At this situation, since the pressure in the control chamber is lower than the pressure in the feedback chamber, the fluid in the feedback chamber 68 may flow through the passage 80 into the control chamber 50, such that the feedback pressure P3 in the feedback chamber 68 decreases, and the force F3 applied by the feedback pressure P3 decreases. When the force F3 applied by the feedback pressure P3 together with the force Fs applied by the feedback spring 70 is lower than the force F1 applied by the pilot pressure P1, the force F1 may force the spool 20 to move downward from the first position to the second position to close the first set of ports 52 and open the third set of ports 56 to the control chamber 50. By doing so, the output pressure from the control chamber to the fluid actuator 204 through the second set of ports 54 can be controlled in a predetermined range.

The pilot pressure P1 can be adjusted to control the output pressure P2. Because the area A1 of the upper end surface 40 is greater than the area A2 of the lower end surface 48, to overcome the force F1 to move the spool 20 from the second position to the first position, the feedback pressure P3 may need to be much greater than the pilot pressure P1. The feedback chamber 68 is in fluid communication with the control chamber 50 through the passage 80, and the pressure P3 is substantially equal to the control pressure P2 in the control chamber 50. Thus, through the cartridge valve assembly 10, a relatively small pilot pressure P1 can be used as an input to generate a relatively large control pressure P2 as an output. The output control pressure P2 may be used to control the actuator 204, which is in fluid communication with the control chamber 50 through the second set of ports 54. In different embodiments, a desired ratio of the output control pressure P2 to the pilot pressure P1 can be achieved by adjusting the ratio of the area A2 to the area A1.

In one embodiment, the cartridge valve assembly 10 may be used as a fluid or pressure regulator. In this embodiment, the pilot signal 208 may be selectively applied to the pilot chamber 44 to selectively control the fluid flow in the hydraulic system 200. In another embodiment, the cartridge valve assembly 10 may be used as a pressure relief valve. In this embodiment, the pilot signal 208 may be constantly applied to the control chamber 44.

The advantages of the disclosed system may include that the disclosed system provides a valve assembly having a combination of a cartridge design and pressure amplification. The cartridge design is compact in size and may fit a wide range of cartridge cavities. The pressure amplification may be beneficial in systems that require applying a small input pressure to generate a large output pressure, for example, in brake systems. Furthermore, a wide range of output control pressure can be achieved by adjusting the input pilot pressure and/or the ratio of the area A1 to the area A2. That may make the disclosed cartridge valve assembly capable to be used in various machine systems, for example, transmission systems and fuel systems.

It will be apparent to those skilled in the art that various modifications and variations can be made to the cartridge valve assembly. Other embodiments will be apparent to those skilled in the art from consideration of the specification and practice of the disclosed cartridge valve assembly. It is intended that the specification and examples be considered as exemplary only, with a true scope being indicated by the following claims and their equivalents.

What is claimed is:

1. A cartridge valve assembly comprising:
   a body having a pilot port, a first port, a second port, and a third port fluidly connected to a central bore;
   a spool positioned within the central bore and being movable between at least a first position and a second position, the spool including:
      a first chamber at a first end surface of the spool in fluid communication with the pilot port;
      a second chamber at a second end surface of the spool;
      a control chamber; and
      a slug bore extending from the second end surface of the spool to a bottom of the spool, the second chamber being formed within the slug bore of the spool;
      wherein the area of the first end surface is greater than the area of the second end surface;
   a passage fluidly communicating the control chamber with the second chamber;
   a slug member slidably received within the slug bore of the spool, the slug member including a bore forming the second chamber with the second end surface; and
   a lower stop member disposed between the slug and the body,
   wherein, in the second position, an upper portion of the lower stop member is received in the slug bore of the spool; and
   wherein, in the first position, the first port and the second port of the body fluidly communicate with the control chamber, and, in the second position, the second port and the third port fluidly communicate with the control chamber.

2. The cartridge valve assembly of claim 1, further including a housing forming a cavity, and including a first port, a second port, and a third port fluidly connected to the cavity, wherein the first port, the second port, and the third port of the body are respectively in fluid communication with the first port, the second port, and the third port of the housing.

3. The cartridge valve assembly of claim 2, further including sealing members adapted to be positioned between an outer surface of the body and an inner surface of the cavity to separate the pilot port of the body, the first port of the body, the second port of the body, and the third port of the body from each other.

4. The cartridge valve assembly of claim 2, further comprising an adapter coupled to an end of the body, wherein the adapter is adapted to sealingly engage the cavity of the housing to prevent fluid from flowing out of the cavity of the housing.

5. The cartridge valve assembly of claim 1, further including a spring received in the bore of the slug member and coupled to the second end surface of the spool, and being adapted to urge the spool to move from the second position to the first position.

6. The cartridge valve assembly of claim 1, wherein the spool includes a first end section, a second end section and an intermediate section, wherein the intermediate section has a smaller diameter than the first end section and the second end section, the intermediate section and the central bore of the body forming the control chamber.

7. A hydraulic actuation system comprising:
a housing forming a cavity, and including a first port, a second port, and a third port fluidly connected to the cavity;
a tank fluidly connected to the first port of the housing;
an actuator fluidly connected to the second port of the housing;
a pump fluidly connected to the third port of the housing;
a body adapted to be inserted into the cavity of the housing, and including a central bore extending along a central axis, a pilot port, a first port, a second port, and a third port fluidly connected to the central bore, wherein the first port, the second port, and the third port of the body are respectively in fluid communication with the first port, the second port, and the third port of the housing;
a spool received in the central bore of the body and being movable between a first position and a second position, the spool forming a first chamber within the central bore at a first end surface of the spool, a second chamber within the central bore at a second end surface of the spool, and a control chamber within the central bore, the area of the first end surface being greater than the area of the second end surface, the pilot port being fluidly connected to the first chamber, the second port being fluidly connected to the control chamber, and the first port and the third port being selectively controlled by the spool to open to the control chamber, the spool including a slug bore extending from the second end surface of the spool to a bottom of the spool, the second chamber being formed within the slug bore of the spool;
a passage fluidly communicating the control chamber with the second chamber,
a slug member slidably received within the slug bore of the spool, the slug member including a bore forming the second chamber with the second end surface; and
a lower stop member disposed between the slug and the body,
wherein, in the second position, an upper portion of the lower stop member is received in the slug bore of the spool; and
wherein, in the first position, the first port and the second port of the body are in fluid communication with the control chamber, allowing fluid to flow from the actuator to the tank, and, in the second position, the second port and the third port of the body are in fluid communication with the control chamber, allowing fluid to flow from the pump to the actuator.

8. The hydraulic actuation system of claim 7, further comprising a spring coupled to the spool and being adapted to urge the spool from the second position to the first position.

9. The hydraulic actuation system of claim 7, further comprising sealing members adapted to be positioned between an outer surface of the body and an inner surface of the cavity to separate the pilot port of the body, the first port of the body, the second port of the body, and the third port of the body from each other.

10. The hydraulic actuation system of claim 7, further comprising a spring received in the bore of the slug member and coupled to the second end surface of the spool, and being adapted to urge the spool to move from the second position to the first position.

11. The hydraulic actuation system of claim 7, wherein the spool includes a first end section, a second end section and an intermediate section, wherein the intermediate section has a smaller diameter than the first end section and the second end section, the intermediate section and the central bore of the body forming the control chamber.

12. The hydraulic actuation system of claim 7, further comprising an adapter coupled to an end of the body, wherein the adapter is adapted to sealingly engage the cavity of the housing to prevent fluid from flowing out of the cavity of the housing.

* * * * *